US006206396B1

(12) United States Patent
Smith

(10) Patent No.: US 6,206,396 B1
(45) Date of Patent: Mar. 27, 2001

(54) CYCLE INCORPORATING SHOCK ABSORBER

(75) Inventor: Jerry R. Smith, Littleton, CO (US)

(73) Assignee: Ezryd, LLC, Littleton, CO (US)

( * ) Notice: Subject to any disclaimer, the term of this patent is extended or adjusted under 35 U.S.C. 154(b) by 0 days.

(21) Appl. No.: 09/173,057

(22) Filed: Oct. 15, 1998

(51) Int. Cl.$^7$ ................................. B62M 5/00; B62J 1/02
(52) U.S. Cl. ...................... 280/283; 280/275; 267/132
(58) Field of Search ........................... 280/275, 283; 267/132

(56) References Cited

U.S. PATENT DOCUMENTS

| 401,295 | * | 4/1889 | Norton | 280/277 |
|---|---|---|---|---|
| 4,997,197 | | 3/1991 | Shultz . | |
| 5,094,424 | * | 3/1992 | Hartway | 280/283 |
| 5,186,074 | | 2/1993 | Arnold . | |
| 5,217,241 | * | 6/1993 | Girvin | 280/284 |
| 5,253,544 | | 10/1993 | Allsop et al. . | |
| 5,285,697 | | 2/1994 | Clausen . | |
| 5,301,570 | | 4/1994 | Li . | |
| 5,324,058 | * | 6/1994 | Massaro | 280/283 |
| 5,326,119 | | 7/1994 | Ganoung . | |
| 5,456,135 | | 10/1995 | Li . | |
| 5,467,665 | | 11/1995 | Huang . | |
| 5,509,677 | | 4/1996 | Bradbury . | |
| 5,511,444 | | 4/1996 | Clausen et al. . | |
| 5,829,733 | * | 11/1998 | Becker | 280/283 |
| 5,857,691 | * | 1/1999 | Fan | 280/275 |
| 5,911,430 | * | 6/1999 | Wuschke | 280/283 |
| 5,927,738 | * | 7/1999 | Kesinger | 280/275 |

* cited by examiner

Primary Examiner—Brian L. Johnson
Assistant Examiner—Matthew Luby
(74) Attorney, Agent, or Firm—Timothy J. Martin; Michael R. Henson; Mark H. Weygandt

(57) ABSTRACT

A cycle adapted to travel in an upright position along a support surface comprises a rigid frame, a plurality of wheels rotatably journaled with respect to the frame, a suspension tube mounted to the frame for reciprocal movement in upward and downward directions, a seat assembly disposed on an upper end portion of the suspension tube, a drive assembly disposed on a lower end portion of the suspension tube for common movement with the seat assembly, a steering mechanism, and a biasing assembly disposed between the frame and the suspension tube. The biasing assembly is operative to bias the suspension tube into a pre-impact position relative to the frame such that movement of the suspension tube in the downward direction is resisted by the biasing assembly through exertion of a restorative force which urges the suspension in a upward direction toward the pre-impact position, thereby cushioning the seat assembly and the drive assembly relative to impacts occurring during operation of the cycle.

14 Claims, 5 Drawing Sheets

CYCLE INCORPORATING SHOCK ABSORBER

FIELD OF INVENTION

The present invention is broadly directed to shock absorbers for use with wheeled vehicles to cushion against impacts during use. The present invention is more particularly directed to shock absorbers disposed in the seated region of a wheeled vehicle, such as a bicycle and the like, to cushion the seat assembly and the drive assembly relative to impacts occurring during operation by imparting common movement thereto. A cycle incorporating such a shock absorber and a methodology for cushioning impact during operation of a cycle are also provided.

BACKGROUND OF THE INVENTION

While the origin of the bicycle dates as far back as the mid-17th century, when wheeled vehicles were moved by the action of pushing on the ground with one's feet, the real technical innovation in this domain came in the early 19th century with the invention of swinging pedal cranks for two wheeled vehicles. At that time, swinging pedal cranks were placed on either side of the front wheel of the bicycle which transmitted a movement to the rear wheel by means of two light connecting rods. This invention was not very successful because the pedals did not rotate, but rather followed circular arcs which caused rider fatigue in the knee joints. The invention which really advanced the innovation of the bicycle came in the mid 1800s when pedal cranks were made to pivot integrally around the axle of the front wheel, to which the pedals transmitted their movement directly. This invention was known as the velocipede. Later that century, spoked wheels and metal frames were designed which made the vehicle appreciably lighter, as well as the incorporation of an endless drive chain to transmit energy directly to the rear wheel.

Bicycles have long been used as a means for both transportation and recreation. In fact, in some countries throughout the world the bicycle is the primary mode of transportation, replacing automobiles, trains, buses, etc. Prior art bicycles abound with design variations concerning primarily size, weight, appearance, flexibility and reliability. There are various types and configurations of bicycles available, the two most popular of which are the mountain-bike and the twenty-one speed, or racing, bike. Regardless of its type, the conventional bicycle is generally characterized by a frame which rotatably supports a plurality of wheels, a steering mechanism mounted to the frame for controlling movement of the wheels, a drive assembly interconnected between the frame and the wheels for imparting rotary movement to the wheels, and a seat upon which the user is supported for transport.

Recent innovations in the evolution of the bicycle have involved improving its shock absorption characteristics. This is particularly true for mountain-bikes which are especially designed to be ridden over rugged terrain. Due to their relatively rigid frames, bicycles transmit shocks resulting from bumps, pot holes, rocks or other discontinuities in the riding surface directly to the rider. Such surface discontinuities, over prolonged period of riding time, can result in discomfort to the rider and increased fatigue as the rider attempts to reposition himself/herself on the bicycle in anticipation of upcoming obstacles.

In an effort to provide a more comfortable environment for the rider, manufacturers have designed various types of shock absorption systems for use primarily with the front and rear wheels of the bicycle. Much like the suspension systems associated with automobiles, bicycle shock absorbers allow the rider to travel smoothly over the rugged terrain. While the bicycle's wheels may jolt up and down, springs between the wheels and the bicycle frame flex and absorb the force of these jolts. This ensures that the force of the bumping is not transferred to the rider. Springs alone tend to produce a bouncing motion, so the suspension system may also incorporate dampers, which slow the movement of the springs to prevent the bicycle and its rider from bouncing up and down.

It is also known to incorporate shock absorbers in other areas of the bicycle frame. For example, U.S. Pat. No. 5,217,241, issued Jun. 8, 1993, relates to such a suspension system which is capable of transforming pedal force into forward motive force when in high gears, while providing increased traction in the lower gears. Here, the shock absorber system comprises a pair of tubular chain stays disposed on either side of the bicycle's rear wheel, first ends of which pivot relative to the frame's seat tube, and second ends of which are joined to a seat stay. Disposed on the seat stay is a displacable spring assembly secured to the upper portion of the seat tube. As the bicycle frame experiences a load while the rear wheel remains affixed against the ground, the chain stays are urged to rotate upwardly about their pivot point. The load force and resulting displacement are transferred directly from the rear axle through the seat stays to the spring assembly.

While the forgoing bicycle shock absorption systems are useful in their own right, there remains a need to provide a new and improved shock absorber for bicycles, or other types of cycles, for cushioning impact in the seated region. It would be desirable for such a shock absorber to be adjustable so that absorption characteristics can be selectively varied with little difficulty by the rider. It would further be desirable for such a shock absorber to be substantially concealed from view within the frame of the cycle so that the cycle is both aesthetically pleasing, yet still able to accommodate various accessories frequently mounted to the bicycle frame. The present invention is directed to meeting these needs, among others.

SUMMARY OF INVENTION

It is an object of the present invention to provide a new and improved shock absorber for use with wheeled vehicles, such as bicycles, tricycles, motorcycles and the like, to cushion against impacts occurring during operation.

Another object of the present invention is to provide a cycle incorporating such a shock absorber to cushion the cycle's seat assembly and drive assembly relative to impacts occurring during operation of the cycle.

A further object of the present invention is to provide a new and improved shock absorber for use with a cycle, which shock absorber is a substantially concealed from view so that it resembles other conventional cycles.

Still a further object of the present invention is to provide a new and improved shock absorber for cycles which is adjustable by a rider to selectively vary shock absorption characteristics.

It is still a further object of the present invention to provide such a shock absorber which is relatively lightweight so that it has minimal effect on the overall weight of the cycle.

Yet another object of the present invention is to provide a new and improved method for cushioning impact during operation of a cycle.

In accordance with these objectives the present invention is, in one sense, related to a shock absorber for use with a cycle adapted to travel in an upright position along a support surface to cushion against impacts. Here, the cycle includes a rigid frame adapted to rotatably support a plurality of wheels, a drive assembly including a pair of foot supports operative upon actuation to impart rotary movement to one of the wheels, and a seat assembly.

The shock absorber broadly includes first and second elongated tubular members and a biasing assembly coupled therebetween. The first elongated tubular member is associated with the frame and the second elongated tubular member has a lower end portion adapted for connection to the drive assembly's foot supports and an opposite upper end portion adapted for connection to the seat assembly such that the foot supports and the seat assembly are interconnected for common movement. The second tubular member is slidably disposed with respect to the first tubular member for movement along the first tubular member's longitudinal axis away from an initial position as determined by a pre-impact condition.

The biasing assembly is coupled between the first and second tubular members so that movement of the second tubular member in a first direction along the longitudinal axis away from the initial position is resisted by the biasing assembly. The biasing assembly is further operative in response to such movement in the first direction to exert a restorative force to urge the second tubular member in a second direction along the longitudinal axis toward the initial position, thereby to cushion the seat assembly and the drive assembly relative to impacts occurring during operation of the cycle.

To this end, the biasing assembly includes a first biasing seat disposed for common movement with the first tubular member and a second biasing seat disposed for common movement with the second tubular member. A resilient member is interposed for compression and expansion between the first and second biasing seats. The biasing assembly also includes a pre-load mechanism operative upon actuation to selectably adjust the restorative force of the biasing assembly when in the pre-impact condition.

The present invention is also directed to a cycle incorporating such a shock absorber. Here, it is preferred that a suspension tube be telescopically received within the cycle's seat tube for reciprocating upward and downward movement along the seat tube's longitudinal axis. The seat assembly is disposed on the upper end portion of the suspension tube and the drive assembly is disposed on the lower end portion of the suspension tube so that it is mounted for common movement with the seat assembly.

It is preferred that the suspension tube and the seat tube are each rigid cylinders having an interior and a surrounding sidewall and that they be interconnected by a guide pin. More specifically, the sidewall of the suspension tube may have a pair of diametrically opposed and longitudinally extending tracking slots, and the side wall of the seat tube may have a pair of diametrically opposed apertures which are alignable with the tracking slots. The guide pin extends through the tracking slots and the apertures so that the suspension tube can reciprocally move upwardly and downwardly relative to the seat tube along a selected tracking distance.

Here again, the biasing assembly preferably includes an upper biasing seat disposed for common movement with the suspension tube, a lower biasing seat disposed for common movement with the seat tube and a compressible, resilient member interposed for compression and expansion between the upper and lower biasing seats. This resilient member may take on a variety of different forms but is preferably either a spring, a compressible polymer, or spring-polymer composite.

In one embodiment of the present invention, each of the upper and lower biasing seats is disposed within the interior of the suspension tube and the guide pin extends through the lower biasing seat to fixedly mount the lower biasing seat within the interior of the seat tube. In another embodiment, each of the upper and lower biasing seats is disposed exteriorly of the suspension tube and is in the form of a bracket mounted, respectively, to the suspension tube and the seat tube.

In the first exemplary embodiment, biasing assembly preferably includes a pre-load mechanism operative upon actuation to selectively adjust the restorative force of the resilient member when the suspension tube is in the pre-impact position relative to the frame. This pre-load mechanism may include a plunger having a plunger shaft adjustably mounted to the upper biasing seat and a plunger head in contact with the resilient member. Preferably, the plunger shaft is threadedly mounted to the upper biasing seat whereby rotation of the plunger shaft relative to the upper biasing seat operates to adjustably vary the restorative force of the resilient member. It is also preferred that the seat assembly include a seat post which is sized and adapted for insertion into the suspension tube, with a lower end portion of the seat post formed as a tool element adapted to engage the plunger shaft and impart rotation thereto.

The present invention also contemplates a method for cushioning impact during operation of a cycle which is adapted to travel in an upright position along a support surface. This methodology broadly comprises a first of rigidly interconnecting the cycle's seat assembly and the drive assembly's foot supports for reciprocal, common movement in upward and downward directions relative to the frame. The methodology also includes a second step of exerting a restorative force on the seat assembly and the foot supports to urge them upwardly toward an initial position relative to the frame in response to a displacement of the seat assembly and foot supports in a downward direction away from this initial position.

These and other objects of the present invention will become more readily appreciated and understood from a consideration of the following detailed description of the exemplary embodiments when taken together with the accompanying drawings, in which:

DETAILED DESCRIPTION OF THE EXEMPLARY EMBODIMENTS

The present invention generally concerns shock absorbers, and is more specifically directed to shock absorbers for use with cycles to cushion against impacts occurring during operation. While the present invention is described herein with reference to a bicycle in the form of a mountainbike, it should be appreciated that the principal features of the shock absorber can also be implemented into other types of wheeled vehicles, such as tricycles, racing bikes or even some motorized vehicles. The shock absorber is especially adapted for use in the seated region of the cycle to cushion the seat assembly and the drive assembly relative to impacts resulting from bumps, pot holes, rocks or other discontinuities in the riding surface.

Figure 1:
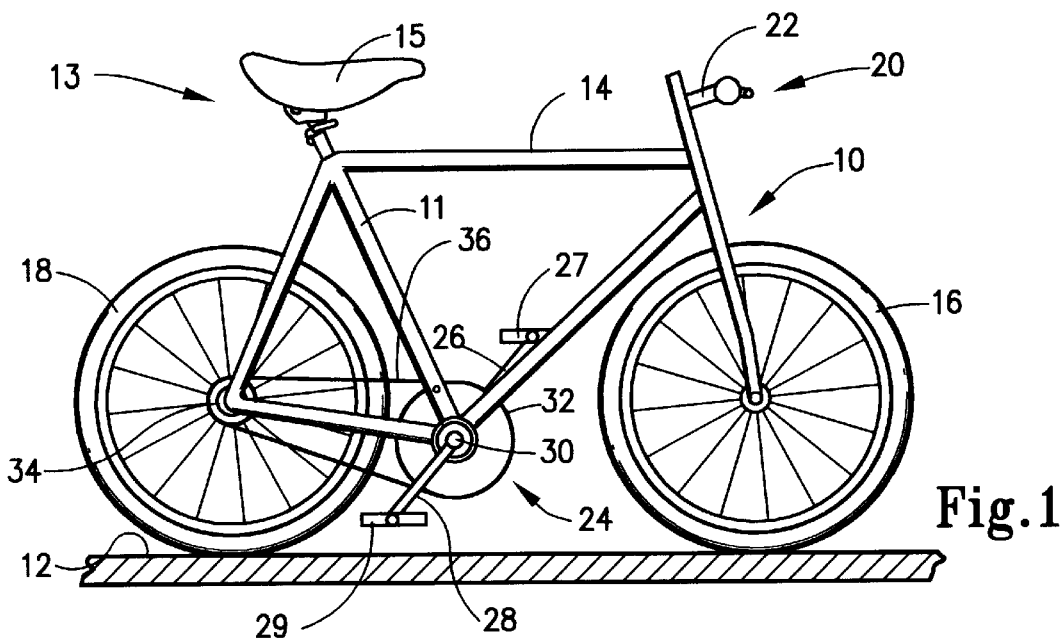
FIG. 1 is a side view in elevation of a bicycle incorporating a shock absorber according to the first exemplary embodiment of the present invention.

Accordingly, and as generally introduced in FIG. 1, the shock absorber is adapted for use with a cycle 10 adapted to travel in an upright position along a support surface 12. Cycle 10 may be a conventional mountainbike so that it includes a rigid frame 14 to which a pair of wheels 16 and 18 are rotatably mounted. A steering mechanism 20 imparts directional movement to the cycle's front wheel 16 upon a rider's manipulation of handle bars 22, while rotary movement is imparted to rear wheel 18 upon actuation of a drive assembly 24 which, for purposes of this invention, includes left and right pedal cranks 26 and 28 and their associated foot supports 27 and 29, respectively.

Pedal cranks 26 and 28 are interconnected along a hub axle 30 which also supports a sprocket chain wheel 32. Sprocket chain wheel 32 is interconnected to a fly wheel 34 by a drive chain 36 so that rotary movement of crank pedals 26 and 28 imparts a corresponding rotary movement to rear wheel 18, all as is known in the art. Of course, cycle 10, as with many conventional bicycles today, might also include front and rear derailers and gear shifters so that a rider can selectively vary the transmission ratio between pedal cranks 26, 28 and rear wheel 18.

Rigid frame 14 includes an elongated seat tube 11 that supports a seat assembly 13 which includes seat 15 upon which the rider sits. The shock absorber according to first exemplary embodiment of the present invention is sized and adapted for use with seat tube 11 to cushion seat assembly 13 and drive assembly 24 relative to impacts occurring during operation of the cycle by imparting common movement to these two assemblies.

Figures 2A, 2B:
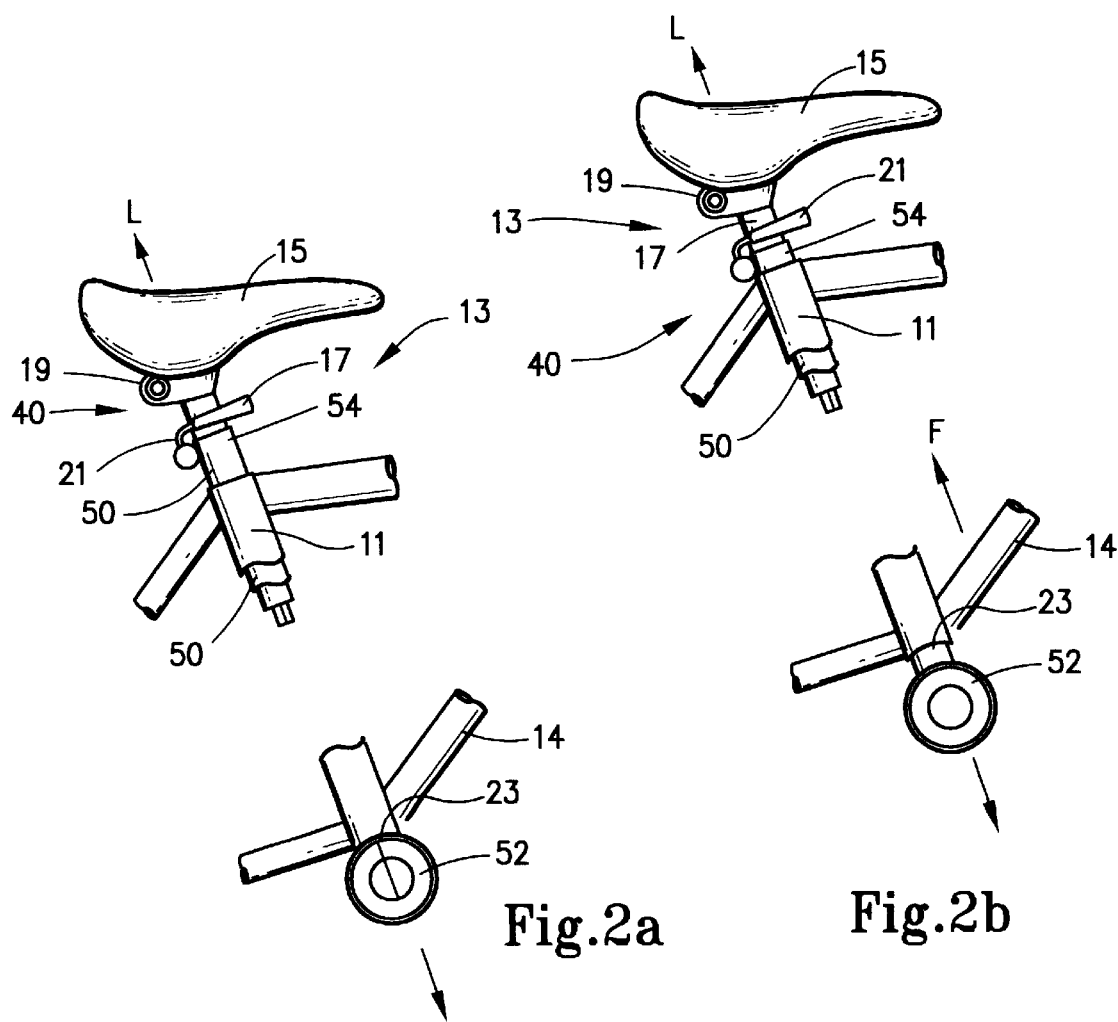
FIG. 2(a) is a side view in elevation, and partially broken away, of a portion of the bicycle in FIG. 1 and showing the suspension tube thereof in an initial position as determined by a pre-impact condition.
FIG. 2(b) is a side view in elevation, and partially broken away, of the portion of the bicycle in FIG. 2(a) and showing the suspension tube thereof displaced downwardly away from the initial position.

To this end, and as shown in FIGS. 2(a) and 2(b), shock absorber 40 includes an elongated suspension tube 50 having lower end portion 52 formed as an enlarged hub to which the drive assembly is mounted and an upper end portion 54 which is adapted for connection to seat assembly 13. Seat assembly 13 also includes a tubular seat post 17 which is mounted to seat 15 by an appropriate mounting clamp 19. Seat post 17 is adjustably mounted within suspension tube 50 at a user defined seat height through the use of an appropriate lever clamp 21. It should be appreciated then that seat assembly 13 and the cycle's drive assembly 24, specifically its pedal cranks and foot supports, are mounted for common movement with one another along a longitudinal axis "L" because they are each fixedly mounted to suspension tube 50.

Prior to encountering a surface discontinuity, such as a bump, suspension tube 50 is disposed in an initial position relative to seat tube 11 as shown in FIG. 2(a). In this initial position, the suspension tube's lower end portion 52 is in close proximity to the bottom end 23 of seat tube 11. However, and as illustrated in FIG. 2(b), when the rider encounters a surface discontinuity, a force "F" is exerted on frame 14 by virtue of its interconnection to wheels 16 and 18 which causes seat tube 11 and suspension tube 50 to move relative to one another. As such, suspension tube 50 moves downwardly relative to seat tube 11 a displacement distance as dictated by the amount of force exerted on frame 14. Stated differently, seat tube 11 moves upwardly with respect to suspension tube 50. This relative downward movement of suspension tube 50 causes seat 15 and the drive assembly to correspondingly move downward relative to seat tube 11, thereby providing a dampening effect to cushion the impact on the rider.

It should be appreciated that the initial position shown in FIG. 2(a) is representative of a pre-impact situation where the rider's own weight does not cause suspension tube 50 to move downwardly relative to seat tube 11. Of course, the actual initial position prior to impact necessarily depends on the weight of the rider as well as the pre-load characteristics of the shock absorber 40 which will be discussed in detail below, so that FIG. 2(a) is only representative of what this initial position might be. The ordinarily skilled artisan should readily appreciate that a principal advantage of the present invention is the common movement of the seat assembly 13 and the drive assembly 24 relative to seat tube 11 away from their initial position, irrespective of what that initial position actually is.

Figure 3:
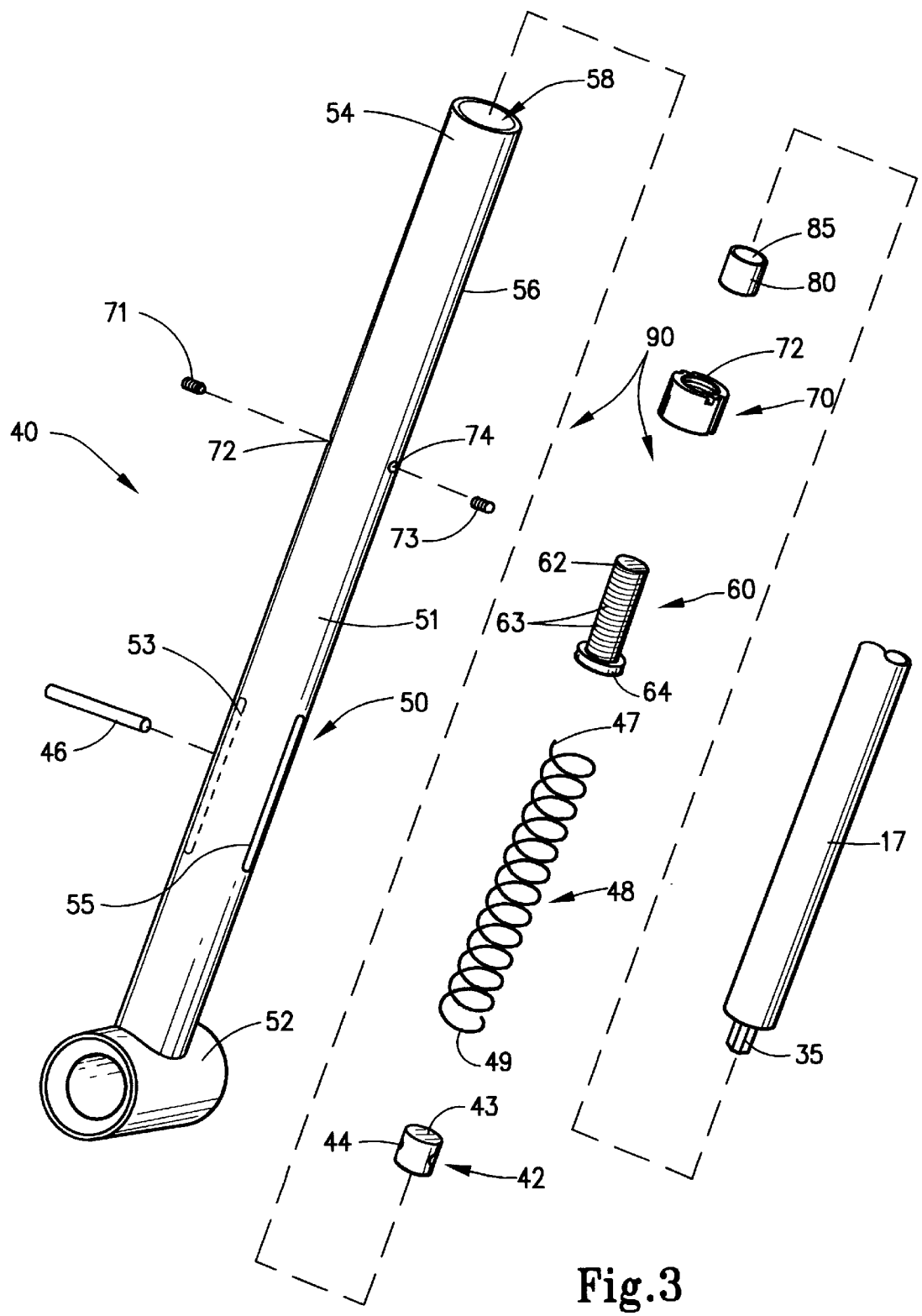
FIG. 3 is an exploded perspective view of the suspension tube assembly for use with the shock absorber constructed according to the first exemplary embodiment of the present invention.
Figure 4:
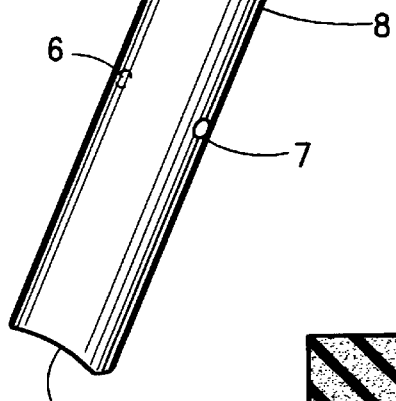
FIG. 4 is a perspective view of the seat tube for use with the shock absorber according to the exemplary embodiments of the present invention.

A preferred construction for the shock absorber 40 according to the first exemplary embodiment of the present invention may be appreciated with reference to FIGS. 3 and 4. Shock absorber 40 broadly includes suspension tube 50, a seat tube 11 and a biasing assembly 90. Suspension tube 50 includes an elongated cylindrical body 51 joined to lower end portion 52. Cylindrical body 51 is formed by a sidewall 56 which surrounds an interior 58 for suspension tube 50. A pair of elongated and diametrically opposed tracking slots 53, 55 are formed through a lower portion of sidewall 56. As shown in FIG. 4, seat tube 11 is also in the form of an elongated cylindrical body formed by a sidewall 8 which surrounds an interior 9 that is sized and adapted to receive the cylindrical body 51 of suspension tube 50. The bottom end 23 of seat tube 11 is contoured so that it follows the contour of lower end portion 52 of suspension tube 50 when in the initial position shown in FIG. 2(a). Seat tube 11 and suspension tube 50 are preferably lightweight and constructed of aluminum, alloy or the like. A pair of diametrically opposed apertures 6 and 7 are formed through the seat tube's sidewall 8 and these apertures 6 and 7 are alignable with the tracking slots 53, 55 when suspension tube 50 is inserted into seat tube 11.

With reference again to FIG. 3, a lower biasing seat 42, which is preferably in the form of a polyurethane stopper, is sized and adapted to be inserted into suspension tube 50 and fastened within its interior between tracking slots 53 and 55 by guide pin 46. More specifically, lower biasing seat 42 includes a central bore 44 through which guide pin 46 is received.

Guide pin 46 has a length which is slightly larger than the diameter of seat tube's sidewall 8 so that, when suspension tube 50 is inserted into seat tube 11, guide pin 46 fixedly mounts lower biasing seat 42 relative to seat tube 11, while permitting lower biasing seat 42 to translate along tracking slots 53, 55 a tracking selected tracking distance "d" dictated by the length of tracking slots 53, 55. As such lower biasing seat 42 is fixedly mounted within the interior of seat tube 11 and movably mounted within the interior of suspension tube 50.

Figure 5:
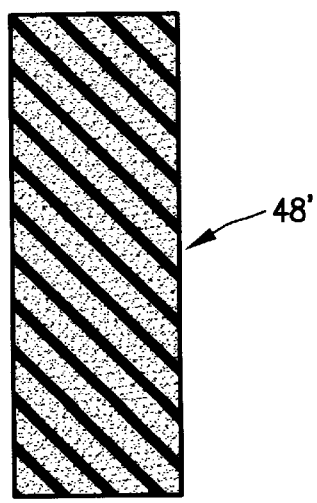
FIG. 5 is an enlarged cross-sectional side view, in elevation, showing a first alternative construction for the resilient member for use with the shock absorber according to the present invention.
Figure 6:
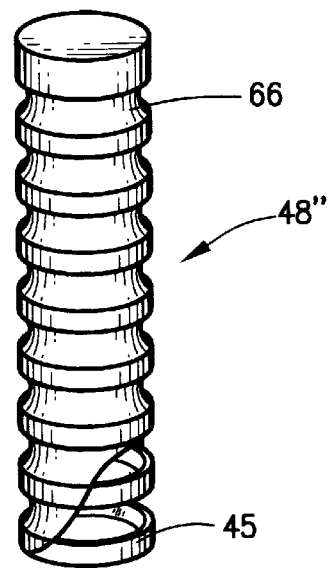
FIG. 6 is an enlarged cross-sectional side view, in elevation, showing a second alternative construction for the resilient member for use with the shock absorber according to the present invention.

An appropriate resilient member 48, such as a coiled spring, is insertable into suspension tube 50 so that its lowermost portion 49 rests on the upper surface 43 of lower biasing seat 42. Resilient member 48 may take on a variety of different forms provided that it is both compressible and expandable. For example, as shown in FIG. 5, a resilient member 48' may be a compressible polymer or alternatively, as shown in FIG. 6, a resilient member 48" may be employed which includes a coiled spring 45 enclosed by a shroud 66. Accordingly, while the exemplary embodiments of the present invention are described herein with reference to a coil spring, the ordinarily skilled artisan should readily appreciate that other types of mechanical devices or polymers can be readily employed for resilient member 48 without departing from the inventive concepts contained herein.

With reference again to FIG. 3, a plunger 60 is provided which includes a plunger head 64 which contacts the uppermost portion 47 of resilient member 48. Plunger 60 also includes a threaded shaft 62 which is sized and adapted to threadedly engage both an upper biasing seat 70 and a socket 80. To this end, upper biasing seat 70 is generally cylindrical in configuration and has a central, threaded channel 72 which is adapted to engage threads 63 on plunger 60. Socket 80 is also cylindrical in configuration and has a threaded lower portion 82, as shown FIGS. 8(a) and 8(b), which is sized and adapted to engage threads 63 on plunger 60 and an upper portion 84 which includes a socket cavity 85 that is sized and adapted to receive an alien wrench tool extension 35 which extends from seat post 17. Together, lower biasing seat 42, resilient member 48, plunger 60, upper biasing seat 70 and socket 80 form a pre-load mechanism 94 for biasing assembly 90.

Figure 7:
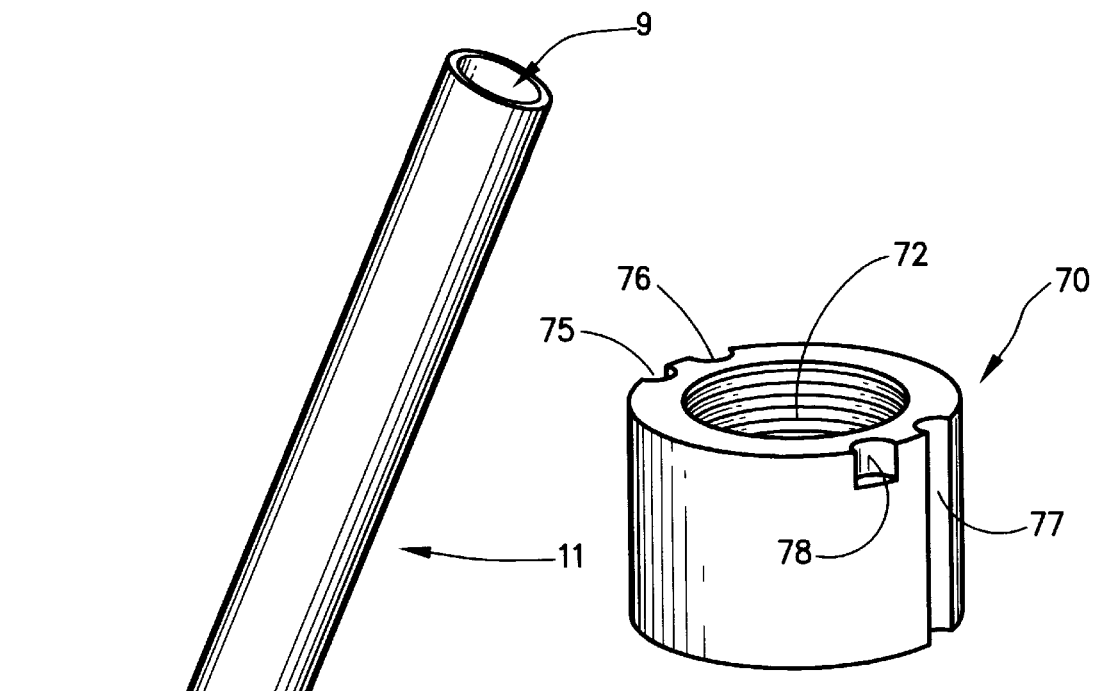
FIG. 7 is an enlarged perspective view of the upper biasing seat for use with the shock absorber according to the first exemplary embodiment of the present invention.
Figures 8A, 8B:
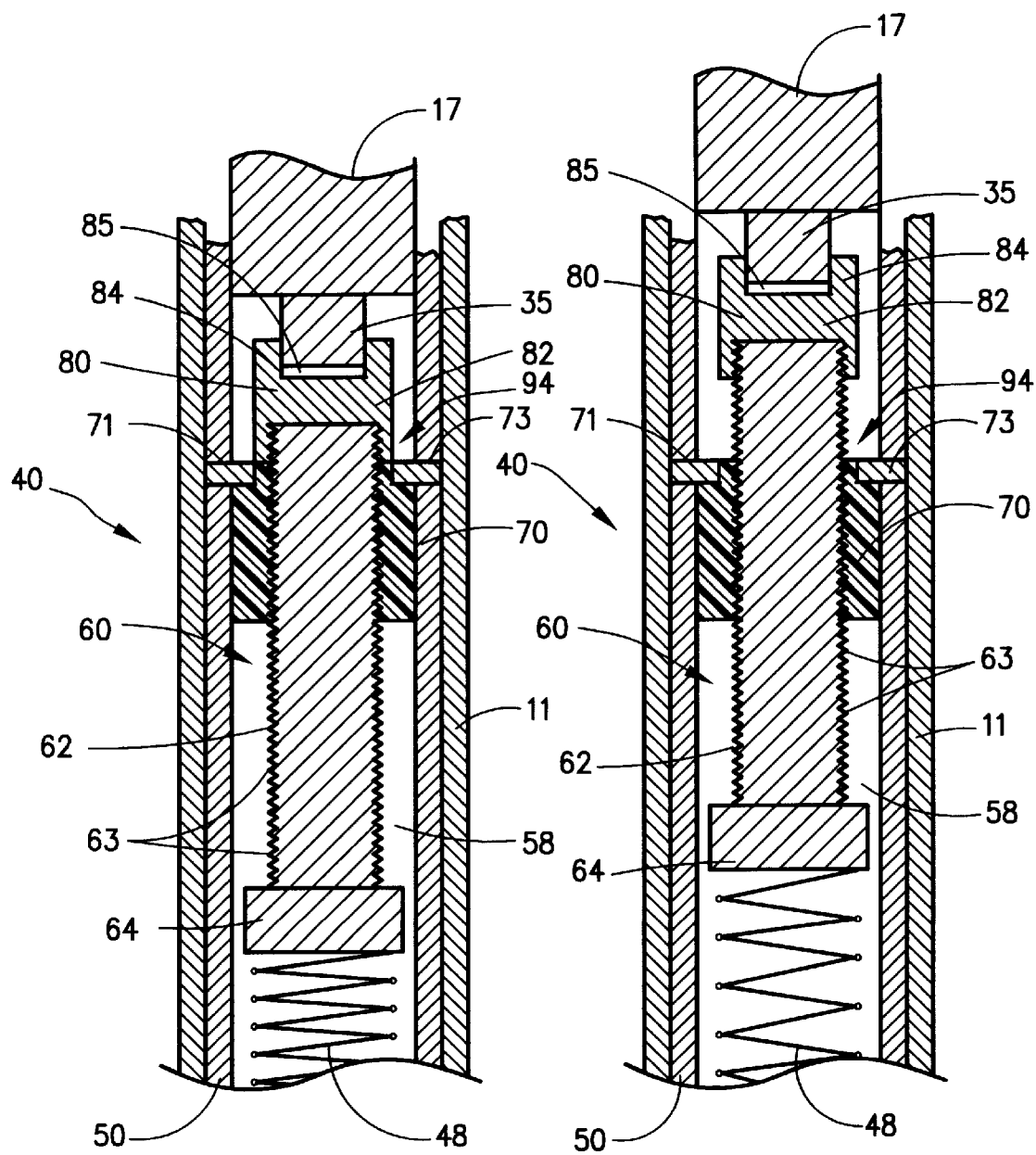
FIGS. 8(a) and 8(b) are each enlarged side views in elevation, and in cross-section, which diagrammatically illustrate the selective adjustability for the pre-load mechanism for use with the shock absorber according to the first exemplary embodiment of the present invention.

As shown in FIGS. 3 and 8 a pair of diametrically opposed holes 72 and 74 are also formed through the sidewall 56 of suspension tube 50 and set screws 71 and 73 are, respectively, adapted for insertion into these holes 72, 74. As best shown in FIG. 7, upper biasing seat 70 is formed to include a pair of diametrically opposed notches 76 and 78 so that, when shock absorber 40 is in the assembled state shown in FIGS. 8(a) and 8(b), upper biasing seat 70 is oriented within suspension tube 50 so that resilient element 48 urges notches 76 and 78 into engagement with set screws 71 and 73. As also shown in FIG. 7, upper biasing seat 70 includes a pair of diametrically opposed grooves 75 and 77 which permit upper biasing seat 70 to be easily inserted or removed from suspension tube 50 without interfering with set screws 71 and 73.

In order to assemble shock absorber 40, as generally shown in FIGS. 8 and 9, suspension tube 50 is slideably inserted into seat tube 11 and guide pin 46 is inserted thought the seat tube's apertures 6 and 7 and the suspension tube's tracking slots 53 and 55, as well as lower biasing seat 42, thereby to telescopically mount suspension tube 50 within seat tube 11 for translation along tracking slots 53 and 55. Resilient member 48 is then inserted through the top of suspension tube 50 so that it rests on lower biasing seat 42. Plunger 60, upper biasing seat 70 and socket 80 are assembled as discussed above and this assemblage is inserted through the top of suspension tube 50 with the assemblage rotated so that the upper biasing seat's grooves 76 and 77 do not interfere with set screws 71 and 73. Thereafter the assemblage can be rotated so that restorative force of resilient member 48 urges the assemblage into engagement with set screws 71 and 73 as shown in the Figures.

As discussed above the shock absorber 40 according to the first exemplary embodiment of the present invention allows for preloading of resilient member 48, and the operation of pre-load mechanism 94 may now be better appreciated with reference again to FIGS. 8(a) and 8(b). When set post 17 is unclamped from suspension tube 50 it may be inserted downwardly into the suspension tube's interior 58 so that tool element 35 engages the cavity 85 formed in socket 80. If pre-load mechanism 94 is initially assembled as shown in FIG. 8(a), counterclockwise rotation of seat post 17 imparts a corresponding counterclockwise rotation to socket 80 and plunger 60 so that plunger head 64 moves upwardly in the direction of the restorative force of resilient member 48 to expand resilient member 48 as shown in FIG. 8(b). Alternatively, seat post 17 can be selectively rotated clockwise to compress resilient member 48 as shown in FIG. 8(a). In either event, it should be appreciated that the rider can selectively pre-load the compressibility of resilient member 48 to a desired restorative force, thereby varying the shock absorption characteristics of shock absorber 40.

Figures 9A, 9B, 10:
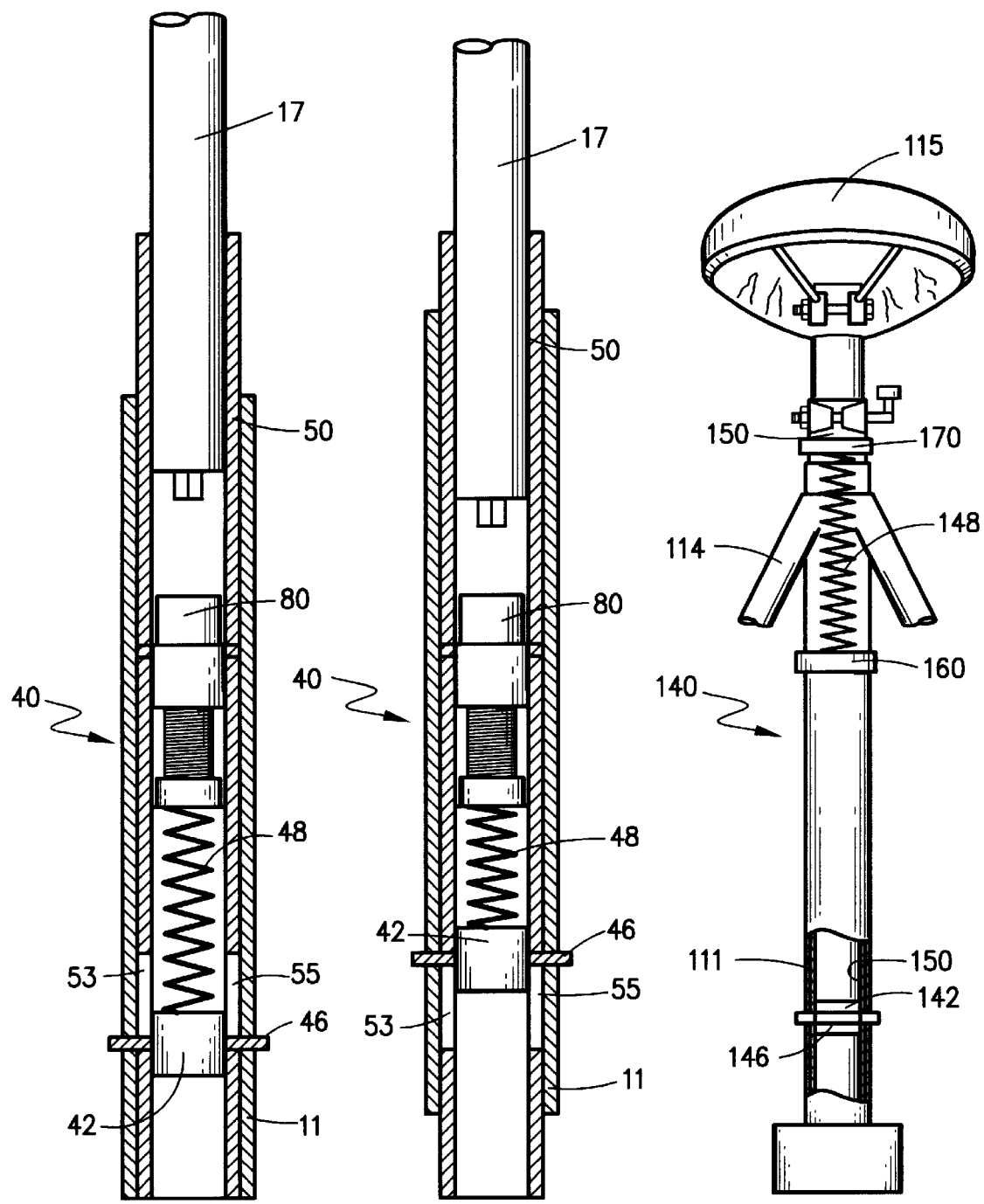
FIG. 9(a) is a side view in elevation and in partial cross-section which diagrammatically illustrates the shock absorber in its pre-impact condition.
FIG. 9(b) is a side view in elevation and in partial cross-section which diagrammatically illustrates the shock absorber in a post-impact condition.
FIG. 10 is a side view in elevation and in partial cross-section of a portion of a conventional cycle incorporating the shock absorber constructed according to the second exemplary embodiment of the present invention.

With an understanding of the construction of shock absorber 40 according to the first exemplary embodiment of the present invention, the operation of shock absorber 40 may be appreciated now with reference to FIGS. 9(a) and 9(b). These figures diagrammatically illustrate the response of shock absorber 40 upon impacts occurring during operation of the bicycle. It should be appreciated that seat post 17 is clamped (not shown) to suspension tube 50 at an appropriate seat height after resilient member 48 is pre-loaded as discussed above.

FIGS. 9(a) and 9(b), for illustrative purposes only, show shock absorber 40 pre-loaded with plunger 60 adjustably mounted to upper biasing seat 70 so that plunger head 64 is at its lowermost displacement distance from upper biasing seat 70.

FIG. 9(a) shows the shock absorber's suspension tube 50 in an initial position as determined by a pre-impact condition. Prior to impact, the restorative force of resilient member 48 urges suspension tube 50 into this initial position wherein the lower end portion 52 of suspension tube 50 is in contact with the lower end 23 of seat tube 11 and guide pin 46 is at its lowermost position within tracking slots 53 and 55.

When an impact is encountered which causes an upward force to be exerted on the cycle's frame, and specifically seat tube 11, seat tube 11 moves upwardly relative to suspension tube 50, as shown in FIG. 9(b). Because lower biasing seat 42 is fixedly mounted within seat tube 11 it also moves upwardly by virtue of the translation of guide pin 46 within tracking slots 53 and 55. This relative upward movement of seat tube 11 causes resilient member 48 to compress between lower biasing seat 42 and plunger 60. In that seat post 17 and the cycle's drive are fixedly mounted to suspension tube 50, they also move downwardly relative to seat tube 11, thereby to cushion the rider against the impact. Once the force is removed, seat tube 11 moves downwardly relative to suspension tube 50 to return to its initial position shown in FIG. 9(a). This shock absorption results in a more comfortable environment for the rider because the bicycle's shock absorption dampens the impact and allows the rider to travel more smoothly over rugged terrain, thereby reducing the force of the impact that is transferred to the rider.

A second exemplary embodiment of the shock absorber of the present invention is shown in FIG. 10. The suspension tube 150 and seat tube 111 for shock absorber 140 are mounted as discussed above through the use of a guide pin 146 extending therethrough and a stopper 142. Here, however, resilient member 148 is located exteriorly of the bicycle frame 114. More Specifically, resilient member 148 is positioned for compression and expansion between a lower mount 160 attached to seat tube 111 and an upper mount 170 attached to suspension tube 150 so that suspension tube 150 can move downwardly relative to seat tube 111 against the restorative force of resilient member 148. As above, shock absorber 140 allows for common movement of the seat assembly 130 and the drive assembly in response impacts occurring during operation because they are fixedly connected to suspension tube 150. Shock absorber 140 according to the second exemplary embodiment of the present invention is more simplified in the construction than shock absorber 40 discussed above in FIGS. 1–9 because it does not incorporate a pre-load mechanism.

With the forgoing description in mind relating to the construction and operation of the shock absorbers of the present invention, it should be appreciated that a methodology for cushioning impact during operation of a cycle is also contemplated. This methodology comprises a first step of rigidly interconnecting the seat assembly and foot supports of a cycle for reciprocal, common movement in upward and downward directions relative to the cycle's frame. A second step of exerting a restorative force on the seat assembly and the foot supports is also provided to urge the seat assembly and the foot supports upwardly toward an initial position relative to the frame in response to a displacement of the seat assembly and the foot supports in a downward direction away from this initial position.

Accordingly, the present invention has been described with some degree of particularity directed to the exemplary embodiments of the present invention. It should be appreciated, though, that the present invention is defined by the following claims constructed in light of the prior art so that modifications or changes may be made to the exemplary embodiments of the present invention without departing from the inventive concepts contained herein

I claim:

1. A cycle adapted to travel in an upright position along a support surface, comprising:

(a) a rigid frame;
   (b) a plurality of wheels rotatably journaled with respect to said frame;
   (c) a suspension tube mounted to said frame for reciprocal movement in an upward direction and a downward direction;
   (d) a seat assembly disposed on an upper end portion of said suspension tube;
   (e) a drive assembly disposed on a lower end portion of said suspension tube for common movement with said seat assembly, said drive assembly including a pair of foot supports and operative upon actuation to impart rotary movement to one of said wheels;
   (f) a steering mechanism coupled to a selected one of said wheels; and
   (g) a biasing assembly disposed between said frame and said suspension tube and operative to bias said suspension tube into a pre-impact position relative to said frame such that movement of said suspension tube in the downward direction is resisted by said biasing assembly, said biasing assembly operative in response to downward movement of said suspension tube to exert a restorative force to urge said suspension tube in an upward direction toward the pre-impact position, thereby to cushion said seat assembly and said drive assembly relative to impacts occurring during operation of the cycle.

2. A cycle according to claim 1 wherein said frame includes an upwardly extending seat tube having a longitudinal axis and wherein said suspension tube is telescopically received within said seat tube.

3. A cycle according to claim 2 wherein each of said suspension tube and said seat tube is formed as a rigid cylinder having an interior and a surrounding sidewall and including a guide pin extending through said suspension tube and said seat tube.

4. A cycle adapted to travel in an upright position along a support surface, comprising:

(a) a rigid frame including an upwardly extending rigid seat tube having a seat tube interior and a surrounding seat tube side wall that includes a pair of diametrically opposed apertures extending therethrough;
   (b) a plurality of wheels rotatably journaled with respect to said frame;
   (c) a suspension tube telescopically received within said seat tube for reciprocal movement in an upward direction and a downward direction, said suspension tube formed as a rigid cylinder having a suspension tube interior and a suspension tube side wall that includes a pair of diametrically opposed and longitudinally extending tracking slots that are alignable with said opposed apertures, there being a guide pin extending through said tracking slots and said apertures;
   (d) a seat assembly disposed on an upper end portion of said suspension tube;
   (e) a drive assembly disposed on a lower end portion of said suspension tube for common movement with said seat assembly, said drive assembly including a pair of foot supports and operative upon actuation to impart rotary movement to one of said wheels;
   (f) a steering mechanism coupled to a selected one of said wheels; and
   (g) a biasing assembly disposed between said frame and said suspension tube and operative to bias said suspension tube into a pre-impact position relative to said frame such that movement of said suspension tube in the downward direction is resisted by said biasing assembly, said biasing assembly operative in response to downward movement of said suspension tube to exert a restorative force to urge said suspension tube in an upward direction toward the pre-impact position, thereby to cushion said seat assembly and said drive assembly relative to impacts occurring during operation of the cycle.

5. A cycle according to claim 4 wherein said biasing assembly includes an upper biasing seat disposed for common movement with said suspension tube, a lower biasing seat disposed for common movement with said seat tube, and including a compressible, resilient member interposed for compression and expansion between said upper biasing seat and said lower biasing seat.

6. A cycle according to claim 5 wherein said guide pin is extends through said lower biasing seat to fixedly mount said lower biasing seat within the interior of said seat tube.

7. A cycle according to claim 5 wherein said resilient member is selected from a group consisting of a spring, a compressible polymer, and a spring/polymer composite.

8. A cycle according to claim 5 wherein each of said upper and lower biasing seats is disposed within the interior of said suspension tube.

9. A cycle according to claim 5 wherein each of said upper and lower biasing seats is disposed exteriorly of said suspension tube.

10. A cycle according to claim 9 wherein each of said upper and lower biasing seats is formed as a mount attached, respectively, to said suspension tube and said seat tube.

11. A cycle according to claim 5 wherein said biasing assembly includes a pre-load mechanism operative upon actuation to selectively adjust the restorative force of said resilient member when said suspension tube is in the pre-impact position relative to said frame.

12. A cycle according to claim 11 wherein said pre-load mechanism includes a plunger having a plunger shaft adjustably mounted to said upper biasing seat and a plunger head in contact with said resilient member.

13. A cycle according to claim 12 wherein said plunger shaft is threadedly mounted to said upper biasing seat whereby rotation of said plunger shaft relative to said upper biasing seat operates to adjustably vary the restorative force of said resilient member.

14. A cycle according to claim 13 wherein said seat assembly includes a seat post sized and adapted for insertion into said suspension tube, and wherein a lower end of said seat post is formed as a tool adapted to engage said plunger shaft and impart rotation thereto.

* * * * *